United States Patent [19]

Mansour

[11] Patent Number: 5,786,303
[45] Date of Patent: Jul. 28, 1998

[54] PLANAR MULTI-RESONATOR BANDPASS FILTER

[75] Inventor: Raafat R. Mansour, Waterloo, Canada

[73] Assignee: Com Dev Ltd., Cambridge, Canada

[21] Appl. No.: 475,653

[22] Filed: Jun. 7, 1995

[30] Foreign Application Priority Data

Jun. 22, 1994 [CA] Canada ............... 2,126,468

[51] Int. Cl.$^6$ .................... H01P 1/203; H01B 12/02
[52] U.S. Cl. .................... 505/210; 333/204; 333/219; 333/99 S; 505/701; 505/866
[58] Field of Search ............... 333/99 S, 204, 333/205, 219; 505/210, 700, 701, 866

[56] References Cited

U.S. PATENT DOCUMENTS

| 5,136,268 | 8/1992 | Fiedziuszko et al. ......... 333/204 |
| 5,172,084 | 12/1992 | Fiedziuszko et al. ......... 333/219 X |
| 5,484,764 | 1/1996 | Fiedziuszko et al. ......... 333/204 X |

FOREIGN PATENT DOCUMENTS

| 104103 | 8/1980 | Japan ......... 333/204 |
| 215202 | 8/1990 | Japan ......... 333/204 |

OTHER PUBLICATIONS

Curtis, J.A & Fiedziuszko, S.J., "Dual Mode Microstrip Filters"; *Applied Microwave*; Fall 1991; pp. 86–93.

*Primary Examiner*—Benny T. Lee
*Attorney, Agent, or Firm*—Daryl W. Schnurr

[57] ABSTRACT

A microwave bandpass filter has a planar configuration formed in microstrip or stripline where a circuit is printed onto a substrate. The filter has at least two patch resonators with a T-shaped coupling path extending between the two resonators. In a further embodiment of the invention, one or more resonators is isolated from other resonators in the filter by being located in a compartmentalized housing or separate housings to eliminate undesirable coupling between a resonator in one compartment and a resonator in another compartment. The filter of the present invention has improved performance characteristics over previous patch resonator filters.

56 Claims, 15 Drawing Sheets

PLANAR MULTI-RESONATOR BANDPASS FILTER

BACKGROUND OF THE INVENTION

1. Field of the Invention

This invention relates to microwave bandpass filters and more particularly to planar dual-mode filter having patch resonators where the filter is implemented using stripline or microstrip and to bandpass filters where one or more resonators are separated from one another within a compartmentalized housing.

2. Description of the Prior Art

It is known to have dual-mode filters where the filter has a plurality of square or circular-shaped resonators (often referred to as "cavities") with each resonator carrying two orthogonal modes coupled by a structural disc continuity at 45°. One such filter is described in Atia, et al., U.S. Pat. No. 5,268,659 entitled "Cononical Dual-Mode Filter" issued November, 1977.

The use of two degenerate modes in microstrip rings and patches to realize dual-mode resonators is known (see a book entitled "Planar Circuits for Microwaves and Light Waves" by T. Okoshi, published in 1985 by Springer-Verlag, pages 36 to 39). See also an article by Wolf entitled "Microstrip Bandpass Filters Using Degenerate Modes of a Microstrip Ring Resonator", Electron LETT, 1972, pages 163 and 164 and further a book entitled "Handbook of Microstrip Antennas" by James, et al., published by Peter Peregrinus Ltd. in 1989, pages 221, 222 and 273. Dual-mode filters made from ring resonators are described in Griffin, et al., U.S. Pat. No. 4,488,131 entitled "MIC Dual-Mode Ring Resonator Filter" and in an article by Guglielmi entitled "Microstrip Ring Resonator Dual-Mode Filters" distributed at a workshop on microwave filters for space applications by European Space Agency/ESTEC in June of 1991. This prior patent and articles describe dual-mode microstrip resonator filters having a structural discontinuity at a 45° angle to the two orthogonal modes.

Fiedziuszko, et al., U.S. Pat. No. 5,136,268 describes a dual-mode planar filter having two or more resonators with a coupling path between resonators being straight or curved, a width of the coupling path being constant over its entire length. The resonators are square resonators with one corner cut-away at a 45° angle to introduce a structural discontinuity. The Fiedziuszko, et al., U.S. Pat. No. 5,172,084 describes a planar dual-mode filter having circular resonators.

A major concern with known patch resonator filters is the difficulty in eliminating undesired coupling between patch resonators that are not interconnected by a coupling path. When this undesirable coupling occurs, the filters cannot be made to realize symmetrical frequency characteristics. Further, known patch resonator filters permit the realization of a relatively narrow bandwidth; or, they have a relatively high loss performance; or, they require the use of tuning elements to achieve the desired coupling.

SUMMARY OF THE INVENTION

It is an object of the present invention to provide a dual-mode patch resonator filter that can be used for conventional room temperature applications or can be constructed of high temperature superconductive films for cryogenic applications. It is a further object of the present invention to provide a dual-mode patch resonator filter that can be made to realize a relatively wide bandwidth with superior loss performance, without tuning elements, the patch resonators being arranged to eliminate undesired coupling between both adjacent and non-adjacent patch resonators.

A bandpass filter in accordance with the present invention includes a plurality of patch resonators in a planar configuration where each resonator has a periphery with perturbation means thereon. The filter has a first coupling path extending between two of said resonators, said coupling path having two ends, each with a substantially perpendicular end portion. The end portions are substantially parallel to and spaced apart from an adjacent section of said periphery of the resonator located immediately adjacent to said end portion. The filter has a housing and an input and output.

In a further embodiment of the invention, a bandpass filter includes a plurality of patch resonators arranged in a planar configuration. Each resonator has a periphery with perturbation means located thereon. Each resonator is mounted in a housing with separation means being located between a first resonator and a second resonator to prevent undesirable coupling between said first and second resonators. The resonators are part of a circuit extending between an input and an output of said filter.

DESCRIPTION OF A PREFERRED EMBODIMENT

The filters of the present invention can be implemented in microstrip and can be realized using gold films for conventional room temperature applications or using newly developed high temperature superconductive films for cryogenic applications. When the word "microstrip" is used in this specification, it shall be interpreted to include stripline or variations thereof.

Figure 1:
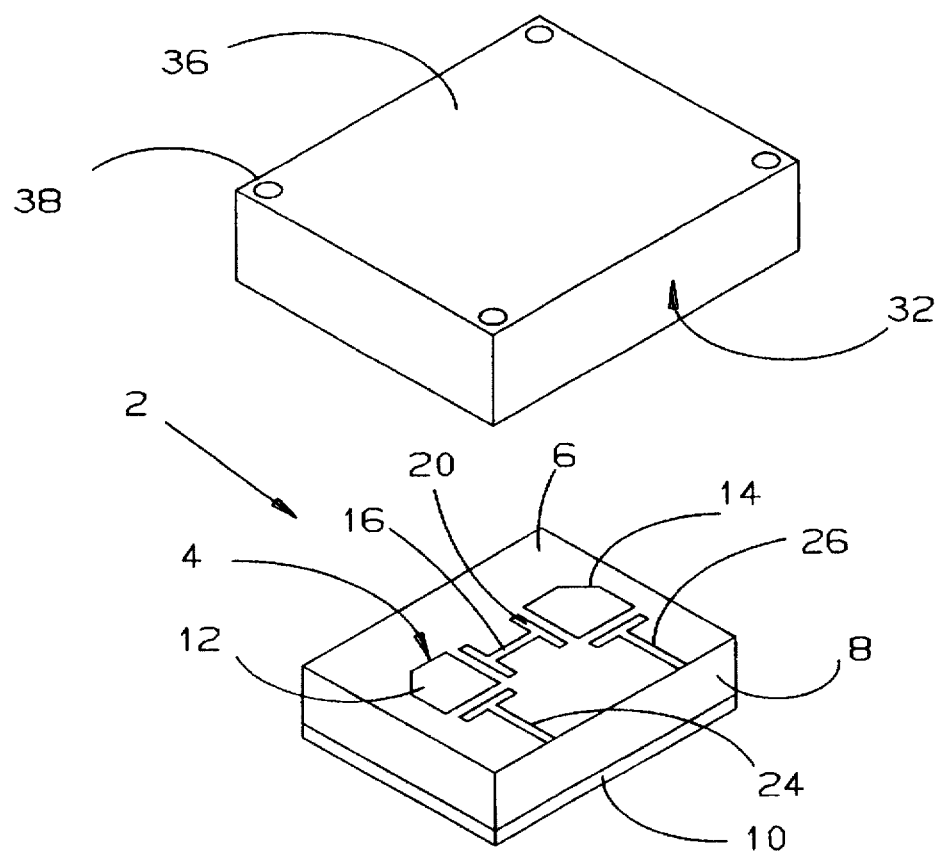
FIG. 1 is an exploded perspective view of a four-pole dual-mode bandpass microstrip filter.
Figure 2:
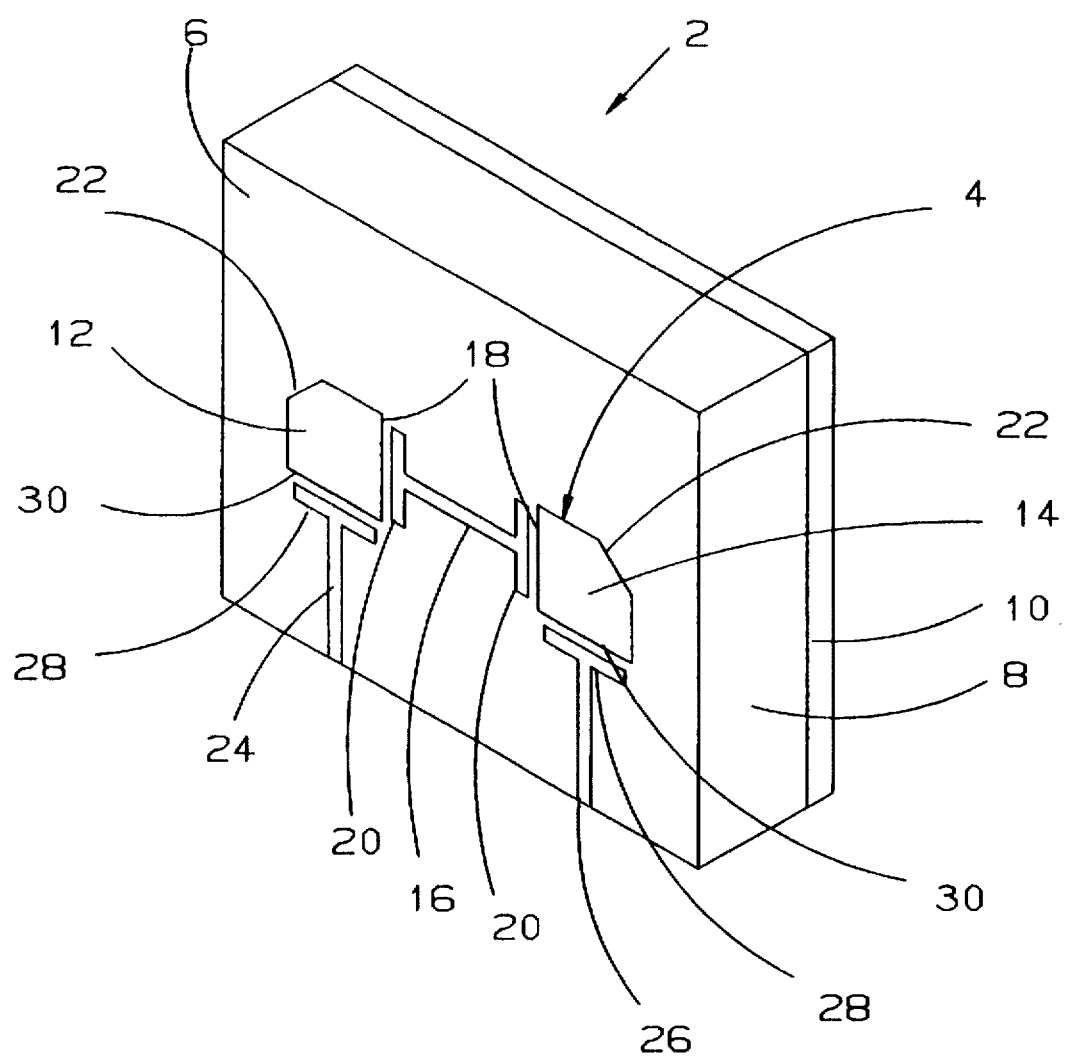
FIG. 2 is a perspective view of a circuit of the filter of FIG. 1.

In FIGS. 1 and 2, a filter 2 has a circuit 4 printed on a top surface 6 of a substrate 8. A bottom surface (not shown) of the substrate 8 is covered by a metallization layer 10. The circuit 4 has two patch rectangular resonators 12, 14 separated by a coupling path 16. The coupling path 16 is substantially perpendicular to inner edges 18 (see FIG. 2) of each of the resonators 12, 14. Each end of the coupling path 16 has a T-shaped end portion 20 that is substantially perpendicular to the coupling path 16 in an area of said end. The end portions 20 are substantially parallel to, but separated from inner edges 18 of each of the resonators 12, 14. Each patch resonator 12, 14 has perturbation means 22 (see FIG.2), located thereon. The perturbation means 22 is a perturbation located at an outer corner of each resonator 12, 14. The perturbation means 22 can be located at other corners of the patch resonators 12, 14 as well and can have a different shape than that shown in FIG. 1. The perturbation means 22 is a cut-off corner at an angle of 45° to edges of the resonators 12, 14.

An input line 24 is parallel to an output line 26. From FIG. 2, the lines 24, 26 each have one end portion 28 that is substantially perpendicular to the lines 24, 26 and substantially parallel to an edge 30 of the resonators 12, 14. The end portions 28 give the input and output lines 24, 26 a T-shape. The T-shaped end portions 28 may be omitted or replaced with various other shapes as will be readily apparent to those skilled in the art. The input line 24 and the output line 26 form part of the circuit 4. The perturbation means 22 is shown to be at an angle of 45° to each mode axis of said filter but other angles will be suitable.

From FIG. 1, the substrate 8 and the circuit 4 are located within a housing 32 having a base 34 and a cover 36. The base and cover each have suitable openings 38 located therein so that the cover can be tightly screwed or bolted onto the base 34 with the substrate 8 located therein. The screws or bolts used to affix the cover 36 to the base 34 are conventional and are not shown. The housing can be made of any known metallic materials or any non-metal that is coated with metallic material. The housing 32 has an input probe 40 and an output probe 42 connected thereto. Patch resonator 12 supports first and second degenerate modes while patch resonator 14 supports third and fourth degenerate modes. The input line 24 and output line 26 are connected directly to the input 40 and output 42 respectively. Coupling between the second mode of patch resonator 12 and the third mode of patch resonator 14 is provided by the coupling path 16 and Tshaped end portions 20.

The various components of a circuit (for example, the circuit 4) as well as the metallization layer (for example, the layer 10) can be made of any known metals, including gold, silver, calcium and copper or they could be made of superconductors or they could be made of ceramic materials, including YBCO (i.e. Yittrium Barium Copper Oxide) and TBCCO (i.e. Thallium Barium Calcium Copper Oxide) which become superconductors at cryogenic temperatures. The substrate 8 can be made of any known dielectric material, including alumina, lanthanum aluminate and sapphire. The substrate 8 is affixed to the base 34 by various means including an adhesive, for example, epoxy, between the ground plate 10 and an interior surface 44 (see FIG. 1) of the base 34.(see FIG. 1)

Figure 3:
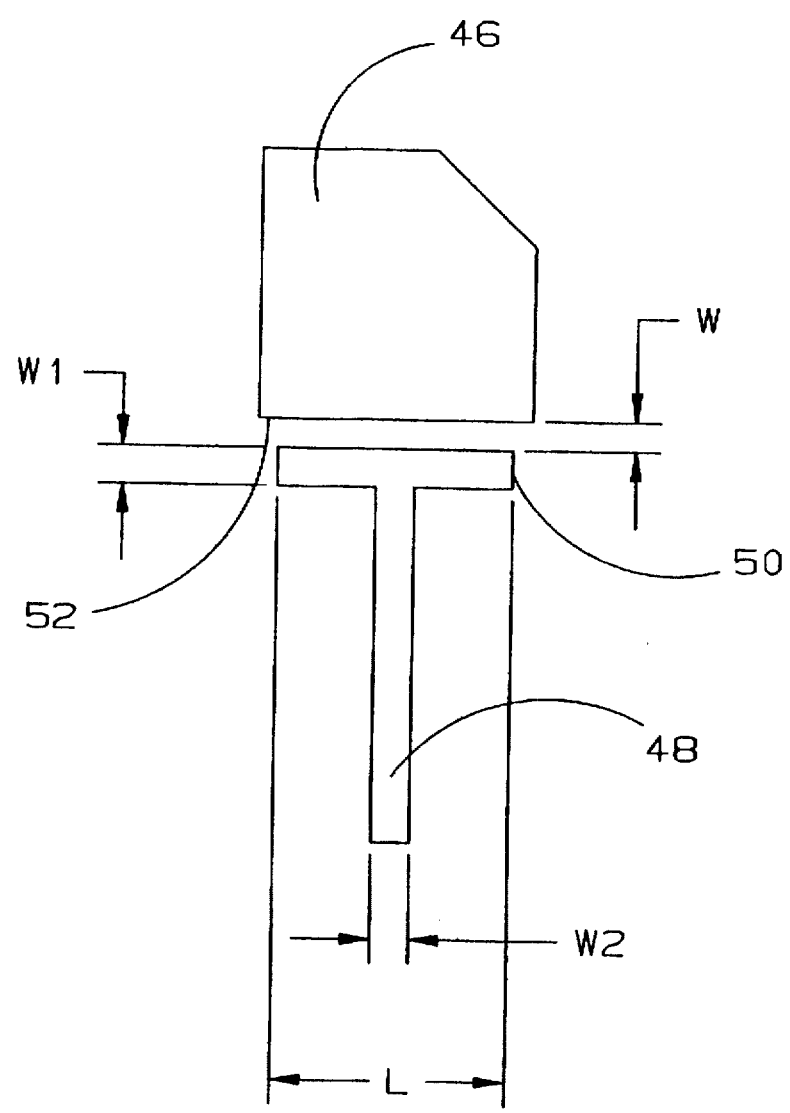
FIG. 3 is a schematic top view of a coupling mechanism for the filter shown in FIG. 1.

FIG. 3 shows a schematic version of part of the circuit 4 of FIG. 1. A value of the RF (i.e. radio frequency) coupling to a patch resonator 46 by a coupling path 48 having an end portion 50 can be varied by adjusting the following four parameters:

(i) a gap width W between the end portion 50 and an inner edge 52 of the resonator 46;

(ii) a length L of a T-shaped end portion 50;

(iii) a thickness $W_1$ of the end portion 50; and (iv) a thickness $W_2$ of the coupling path 48.

The T-shaped coupling mechanism shown in FIG. 3 results in larger coupling values being attainable than with previous devices. The larger coupling values allow the realization of a relatively wider bandwidth filter than would be attainable without the coupling mechanism (i.e. without the end portion 50). In addition, in the arrangement shown in FIG. 2, the coupling mechanism allows coupling between the second and third modes but will not permit coupling between the first and fourth modes.

Figure 4:
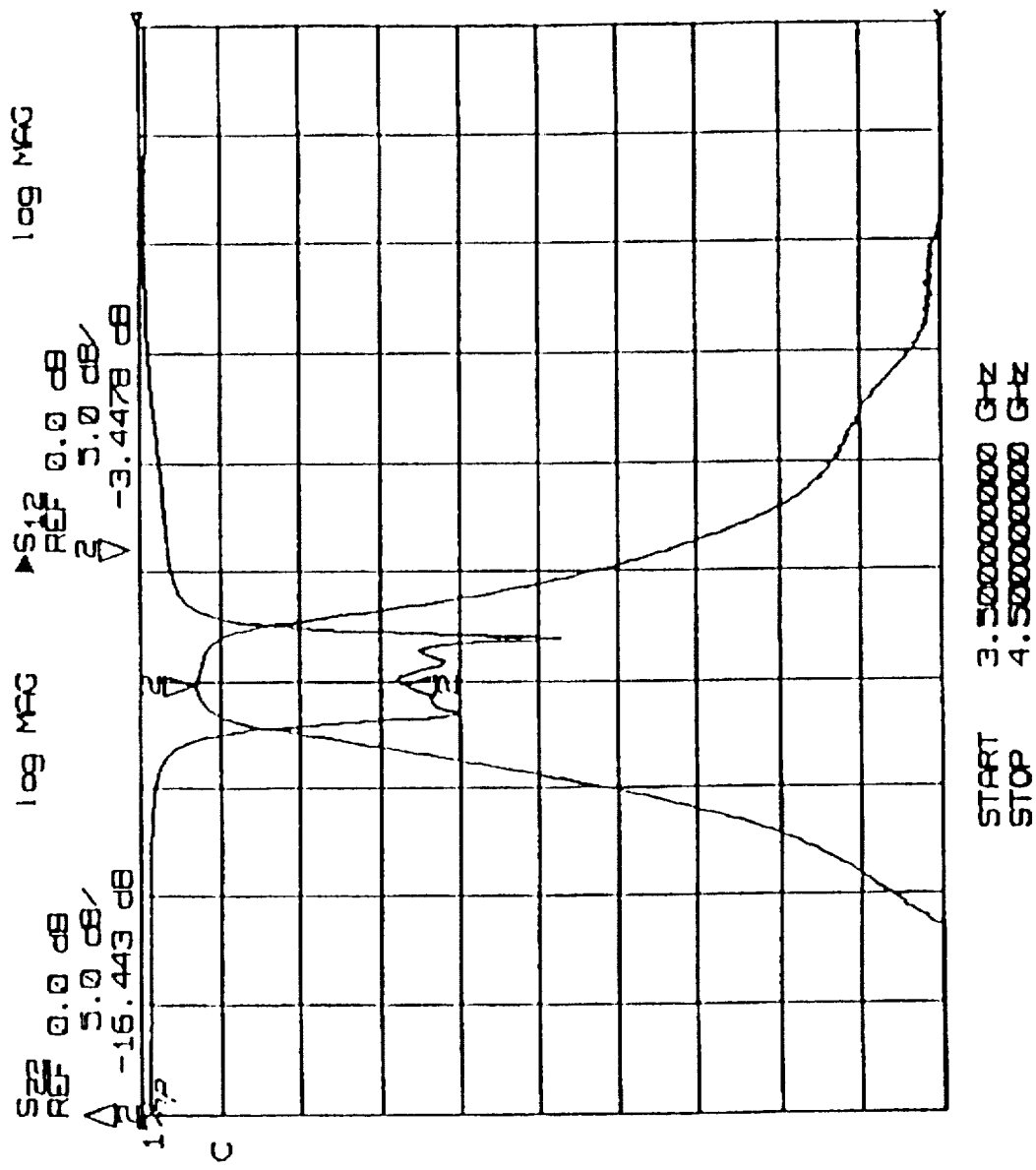
FIG. 4 is a graph showing the insertion loss and return loss for a four-pole filter constructed as shown in FIG. 1.

In FIG. 4, the insertion loss and return loss results of a four-pole filter constructed in accordance with FIG. 1 are shown. A gold film was printed onto a lanthanum aluminate substrate. The loss of 3.4478 dB is high because a gold film was used. The coupling path between the resonators permits coupling between the second and third modes and the filter realizes a Chebyshev filter response (i.e. the coupling path will not permit the creation of undesired coupling between the first and fourth modes). No tuning elements were used to attain the results shown in FIG. 4.

Figure 5:
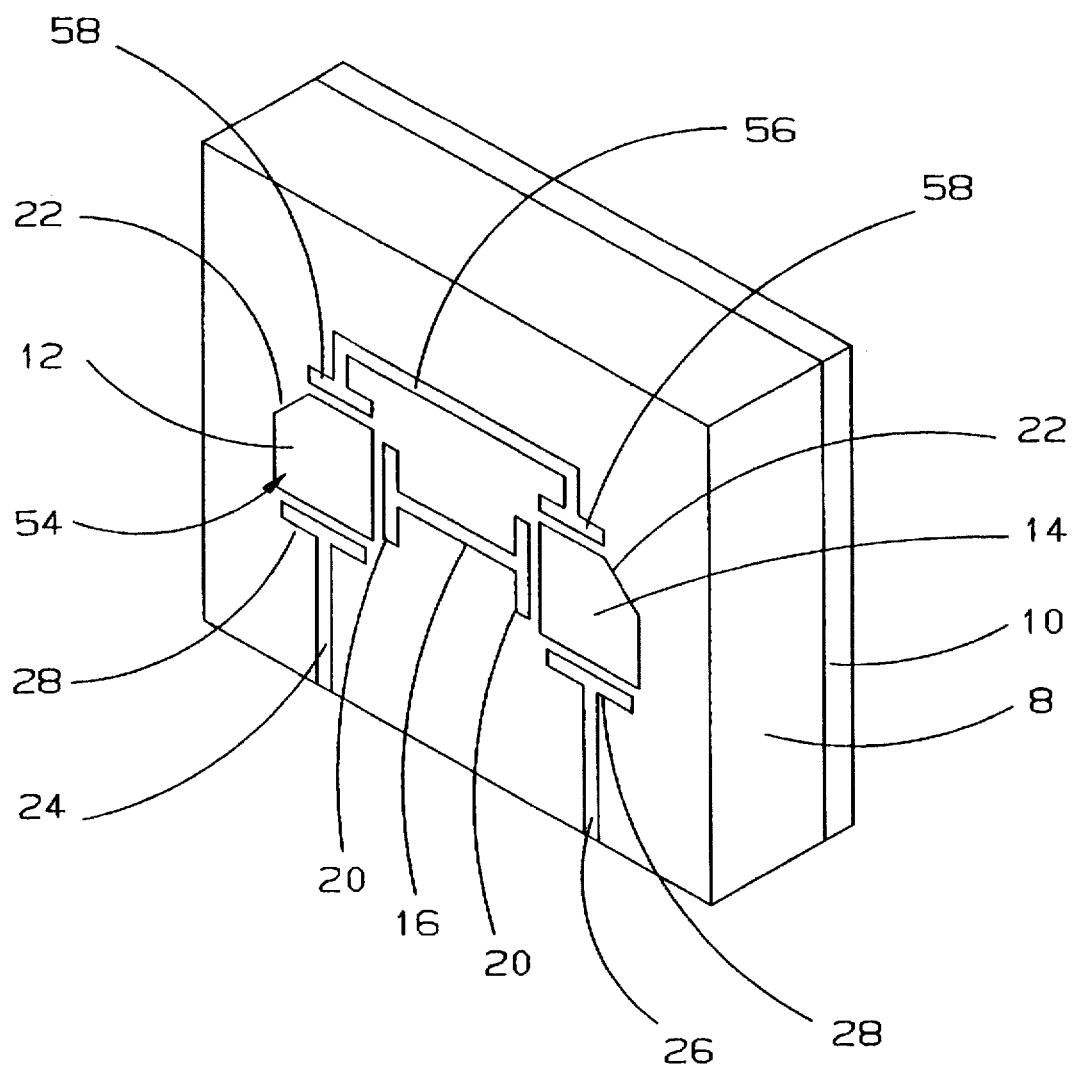
FIG. 5 is a perspective view of a variation of a four-pole dual-mode circuit that can be used in a filter in place of the circuit shown in FIG. 2 to realize an elliptic function filter or a linear phase filter.

In FIG. 5, there is shown a circuit 54 that is a variation of the circuit 4 shown in FIGS. 1 and 2. The same reference numerals are used in FIG. 4 as are used in FIGS. 1 and 2 to refer to the same components.

The particular circuit 54 has an additional coupling path 56 extending between the patch resonators 12, 14 and includes the coupling paths 16, 56, the resonators 12, 14 and the input and output lines 24, 26. The additional coupling path 56 is U-shaped with T-shaped end portions 58 located adjacent to, but spaced apart from, each of the resonators 12, 14. The T-shaped end portions 58 are substantially perpendicular to the conducting path in an area of the ends of said coupling path. The additional coupling path 56 provides an additional coupling between a first mode of patch resonator 12 and a fourth mode of patch resonator 14. The circuit 54 can be used to realize an elliptic function filter or a linear phase filter. While the additional coupling path 56 is shown as being U-shaped, other shapes will be suitable as well. When the circuit 54 is used in an elliptic function filter, the additional coupling carried out through path 56 should be negative. The coupling value through the path 56 and whether the coupling is positive or negative can be controlled by adjusting the length of the U-shaped path in addition to adjusting the four parameters W, $W_1$, $W_2$ and L described in FIG. 3.

Figure 6:
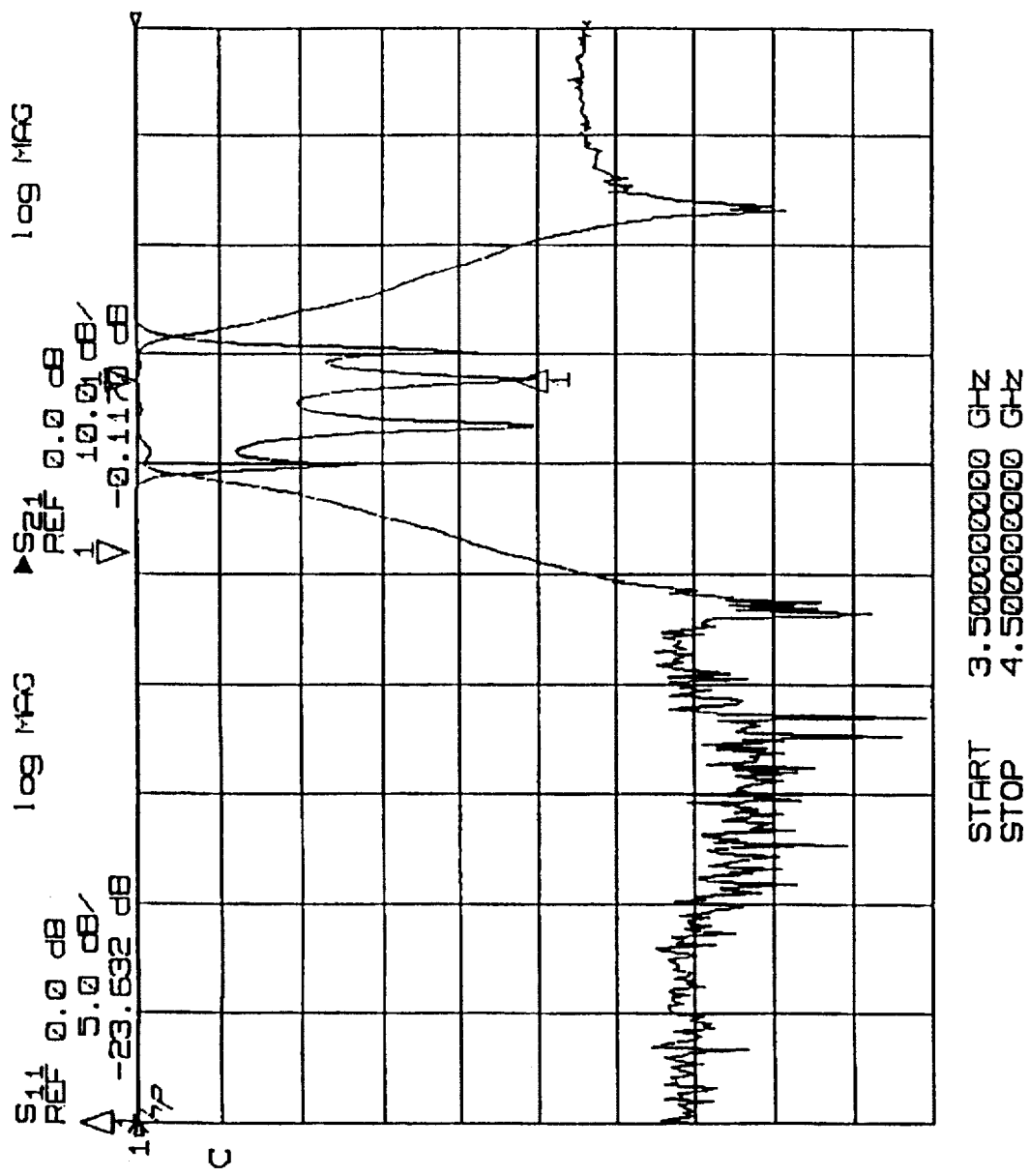
FIG. 6 is a graph showing the insertion loss and return loss of a four-pole filter using the dual-mode circuit shown in FIG. 5.

In FIG. 6, there is shown the insertion loss 25 and return loss for the four-pole filter using the circuit 54 of FIG. 5. The dimensions of the coupling elements are chosen to produce a negative coupling between the first mode of the resonator 12 and the fourth mode of the resonator 14. The insertion loss curve has two notches because of the negative coupling through coupling path 56. Since this is a four-pole filter, there are four peaks in the return loss curve. The loss of 0.1170 dB is very small compared to the loss described in FIG. 4 because a superconductive film was used for the filter of FIG. 5. These results were produced without the use of any tuning mechanism in the filter utilizing the circuit 54.

Figure 7:
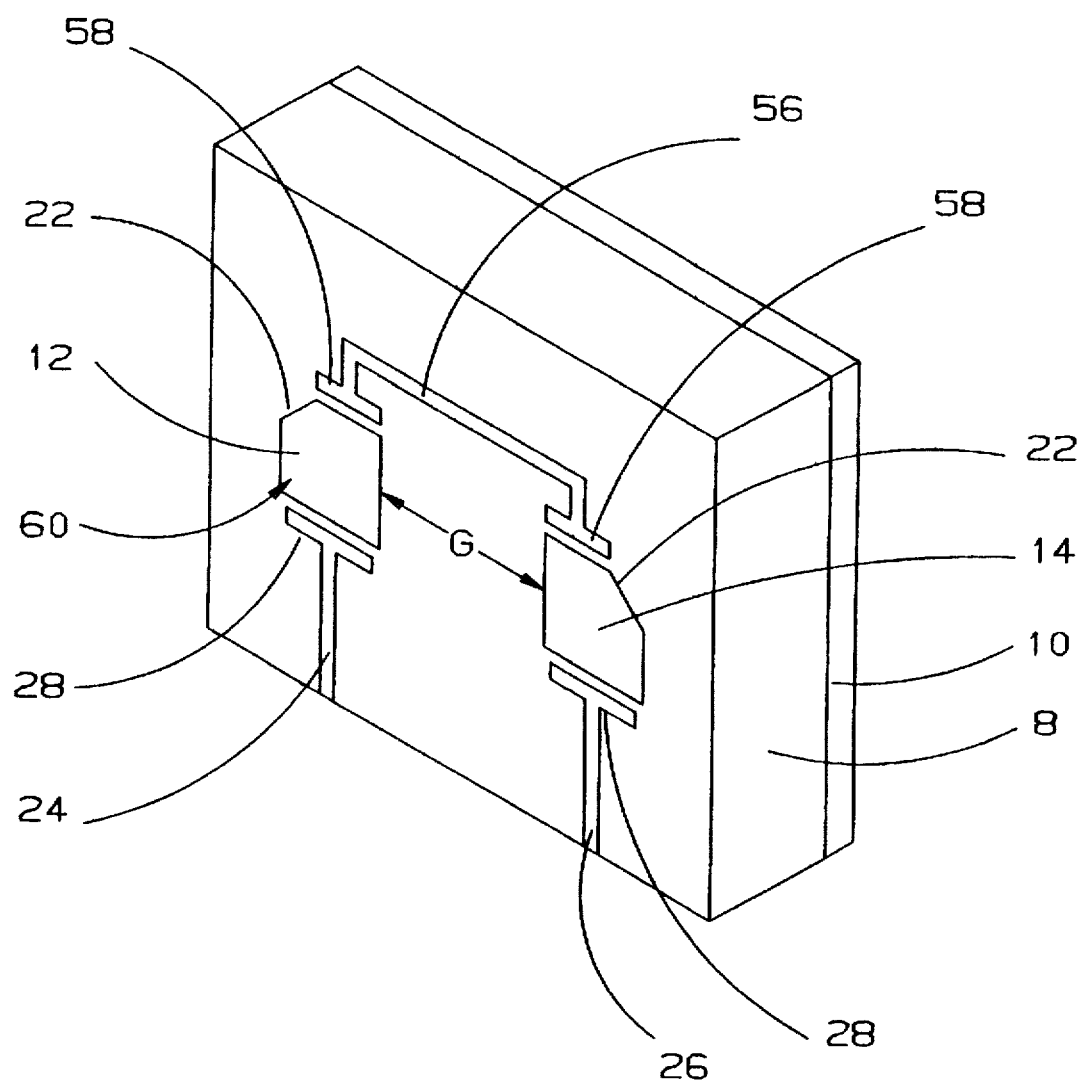
FIG. 7 is a perspective view of a further variation of a four-pole dual-mode circuit that can be used in a filter in place of the circuit shown in FIG. 2.

FIG. 7 shows a further variation of the circuit 4 of FIG. 1 and the circuit 54 of FIG. 4. The same reference numerals used in FIGS. 1 and 4 are used in FIG. 5 for the same components. In FIG. 7, a circuit 60 has a U-shaped coupling path 56 as shown in FIG. 5 extending between the resonators 12, 14, but the coupling path 16 of FIG. 5 has been omitted. The circuit 60 includes the resonators, the coupling path and the input lines and output lines. Coupling between the second mode of patch resonator 12 and the third mode of patch resonator 14 is provided through a gap G, being a perpendicular distance between the resonators 12, 14. An advantage of the gap coupling mechanism is that the patch resonators 12, 14 can be brought closer together which can result in an overall smaller filter structure than that shown in FIGS. 1 and 5. The gap coupling mechanism results in undesired coupling between the first mode of patch resonator 12 and the fourth mode of patch resonator 14. This undesired coupling can be controlled by adding the coupling path 56. The coupling between the first and fourth modes can be adjusted to zero (for Chebyshev realization), or to a positive value (for linear phase realization), or to a negative value (for elliptic function realization). In FIG. 7, it should be noted that the perturbation means 22 or corner cut for each of the resonators 12, 14 is located so that the undesired coupling between the first and fourth modes will have a positive value.

Figure 8:
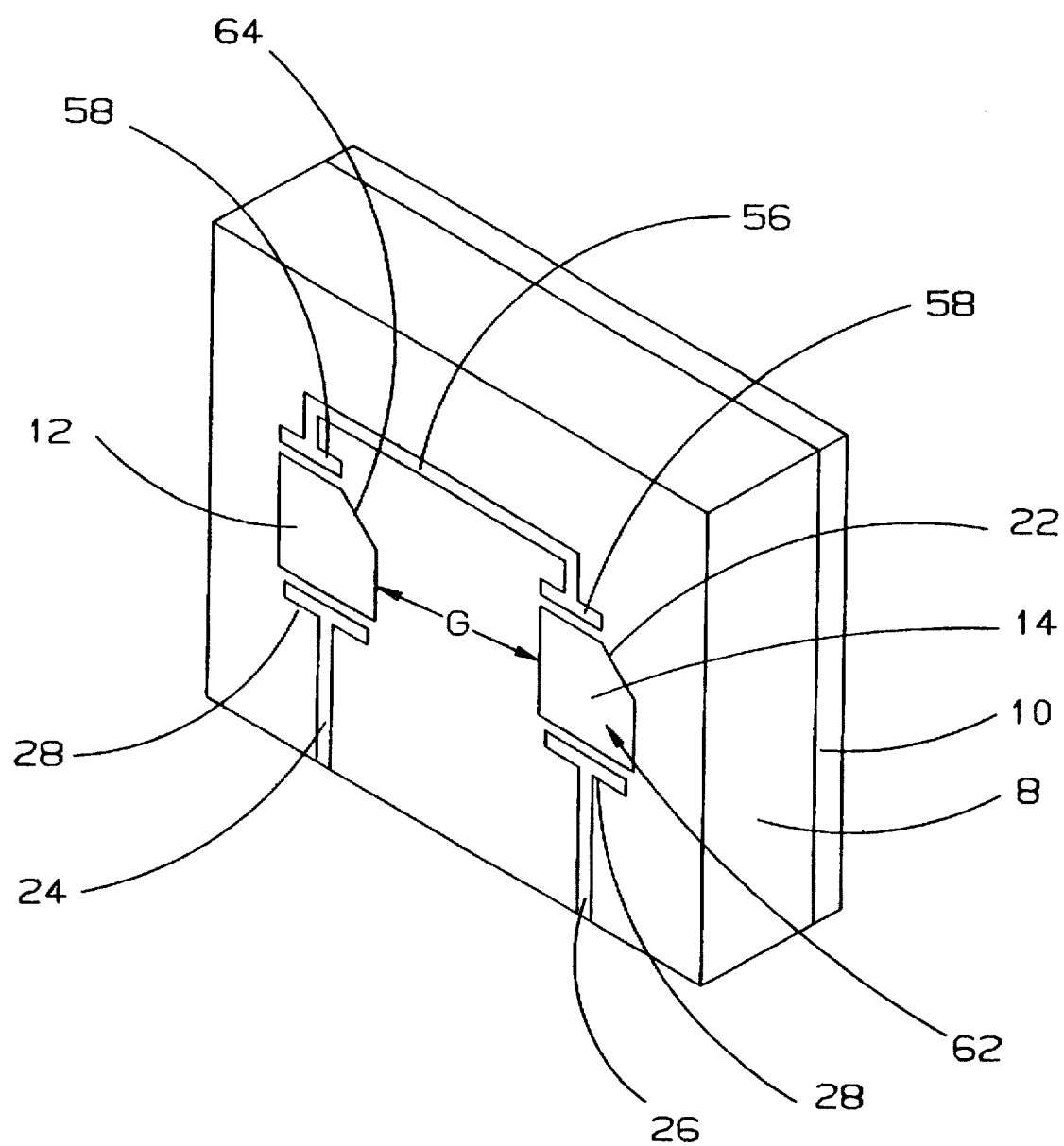
FIG. 8 is a perspective view of a variation of the circuit shown in FIG. 7 with a change in location of a perturbation.

In FIG. 8, a circuit 62 is identical to the circuit 60 of FIG. 7 except that a perturbation means 64 or corner cut of the patch resonator 12 is located on an inside corner adjacent to the coupling path 56 rather than an outside corner 22 as previously shown in FIG. 7. The perturbation means or corner cut of the patch resonator 14 is unchanged from that shown in FIG. 7. The undesired coupling between the first mode of the resonator 12 and the fourth mode of the resonator 14 is made negative by the location of the corner cut 64 as shown in FIG. 8. The same reference numerals have been used to describe the same components in FIGS. 7 and 8. The overall coupling between the first and fourth modes can be adjusted to be positive, zero or negative, as desired, with the circuit 62 shown in FIG. 8 by utilizing the coupling path 56 and end portions 58.

Figure 9:
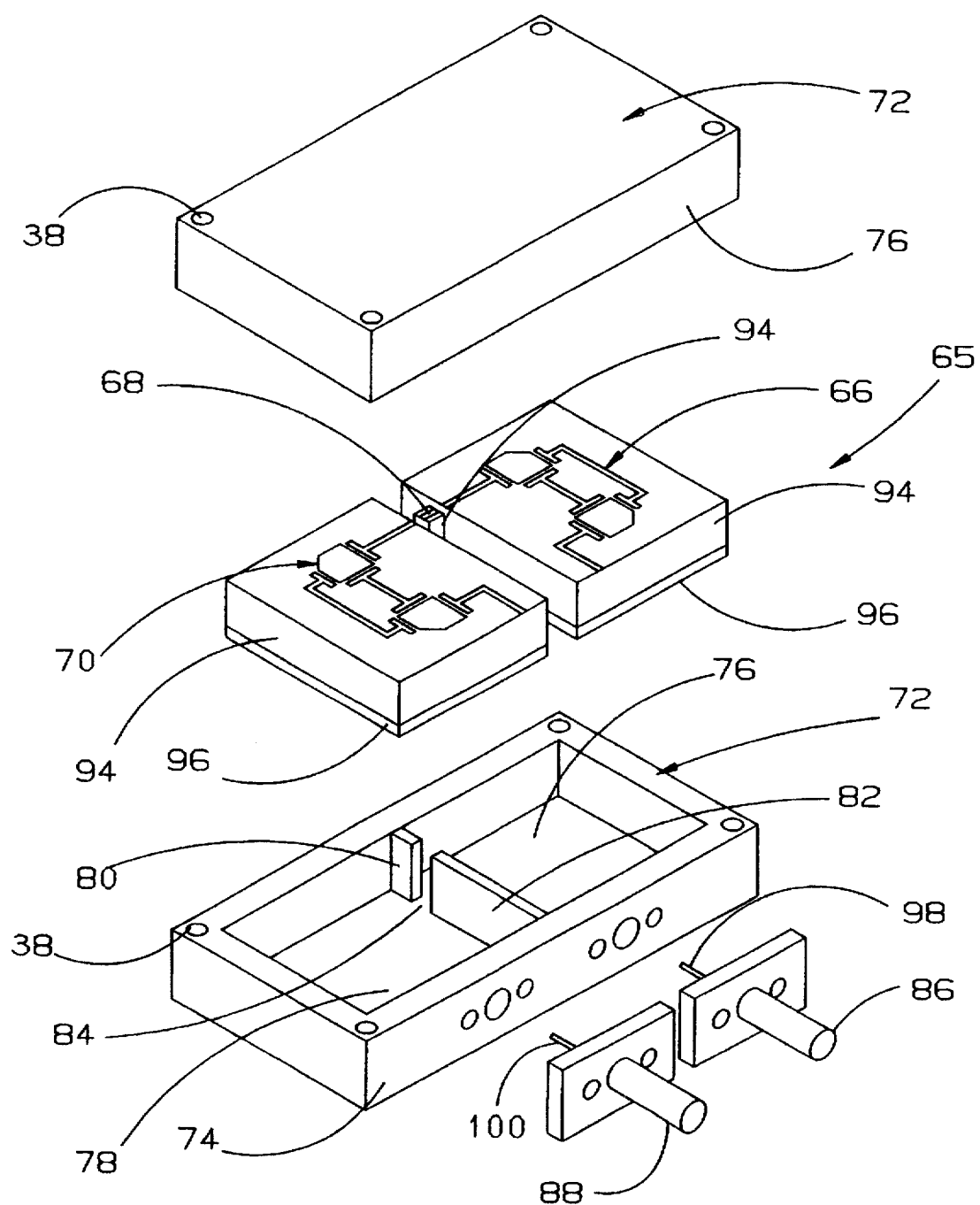
FIG. 9 is an exploded perspective view of an eight-pole dual-mode filter having two circuits containing two resonators each where each circuit is in a different compartment of a housing.
Figure 10:
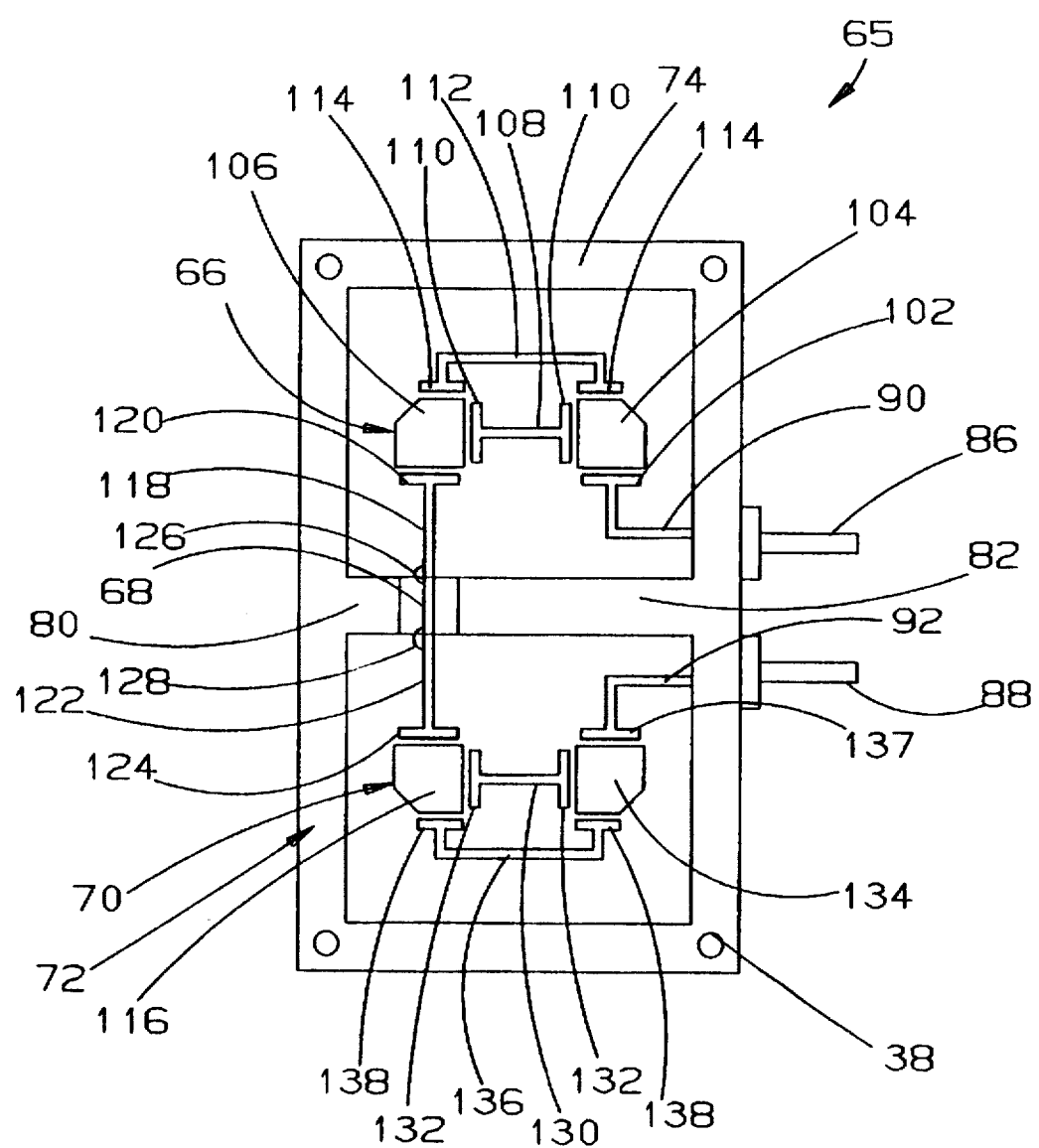
FIG. 10 is a top view of the circuits of the filter of FIG. 9 assembled in a housing with a cover removed.

In FIGS. 9 and 10, there is shown an exploded perspective view of an eight-pole dual-mode filter 65 having three partial circuits 66, 68, 70 mounted in a compartmentalized housing 72 having a base 74 and a cover 75 (see FIG. 9). The partial circuits 66, 68, 70 together constitute the circuit for the filter 65. The base 74 of the housing 72 has two compartments 76, 78 (see FIG. 9) that are separated by two septa 80, 82. The septa 80,82 are physical barriers that constitute separation means between the resonators. The septa 80, 82 are separated by an aperture 84 into which is inserted the partial circuit 68. The partial circuits 66, 70 are inserted into the compartments 76, 78 respectively. The housing 72 has an input 86 and an output 88. The partial circuits 66, 70 are generally mirror images of one another and each of said circuits is generally identical to the circuit 54 of FIG. 5 except for the angle of an input path 90 and an output path 92 (see FIG. 10). The opening 38 are identical to the opening 38 of FIG. 1.

While the partial circuits 66, 70 have generally the same shape, the four parameters W, L, $W_1$, $W_2$, described with respect to FIG. 3 may vary between the partial circuit 66 and the partial circuit 70. Those variations may apply between all circuits of the present application where it is stated that two or more circuits are "generally mirror images" or are "generally identical" or similar variations of those phrases. The partial circuits 66, 68, 70 have a substrate 94 and a metallization layer 96 as shown in FIG. 9 (not shown for the circuit 68). The assembled version of the partial circuits 66, 68, 70 in the base 74 of the housing 72 is shown in FIG. 10. The input 86 and output 88 are two connectors that have inner conductors 98, 100 (see FIG. 9) that are connected to the two partial circuits 66, 70 respectively. While the substrate 94 and metallization layer 96 for each of the partial circuits is cut so that each partial circuit is a separate piece, the partial circuits can be formed on one substrate and one metallization layer which can be cut so that the circuit is in one piece only or in two pieces only.

With continuing reference to FIG. 10, in operation, RF energy is coupled to the filter 65 through the input 86 and through the input path 90 and a T-shaped end portion 102 to a patch resonator 104. Coupling between a second mode of resonator 104 and a third mode of a resonator 106 of the partial circuit 66 is provided by a coupling path 108 and two T-shaped end portions 110. Coupling between a first mode of the resonator 104 and a fourth mode of the resonator 106 is provided through a U-shaped coupling path 112 with T-shaped end portions 114. Coupling between the fourth mode of the resonator 106 of the partial circuit 66 and a fifth mode of a resonator 116 of the partial circuit 70 is provided by interconnecting an output path 118 and T-shaped end portions 120 of the partial circuit 66 through the partial circuit 68 to an input path 122 and T-shaped end portion 124. Interconnects 126, 128 to and from the partial circuit 68 can be of various known forms for line interconnects including ribbon bonding, wire bonding and epoxying. When the circuit is one piece, the interconnects can be eliminated. A coupling path 130 and T-shaped end portion 132 of the partial circuit 70 provide coupling between a sixth mode of the resonator 116 and a seventh mode of the resonator 134 of the partial circuit 70. A coupling path 136 and T-shaped end portions 138 of the partial circuit 70 provide coupling between a fifth mode of the resonator 116 and an eighth mode of the resonator 134 of the partial circuit 70. The RF energy is coupled out of the filter through the output path 92 and a T-shaped end portion 137 to the output 88.

The septa 80, 82 eliminate undesired coupling between patch resonator 104 of partial circuit 66 and patch resonators 116, 134 of partial circuit 70. Similarly, the septa 80, 82 eliminate undesired coupling between patch resonator 134 of the partial circuit 70 and patch resonators 104, 106 of the partial circuit 66. The septa 80, 82 also help to eliminate undesired waveguide modes that might propagate in the filter if the septa were removed.

Figure 11:
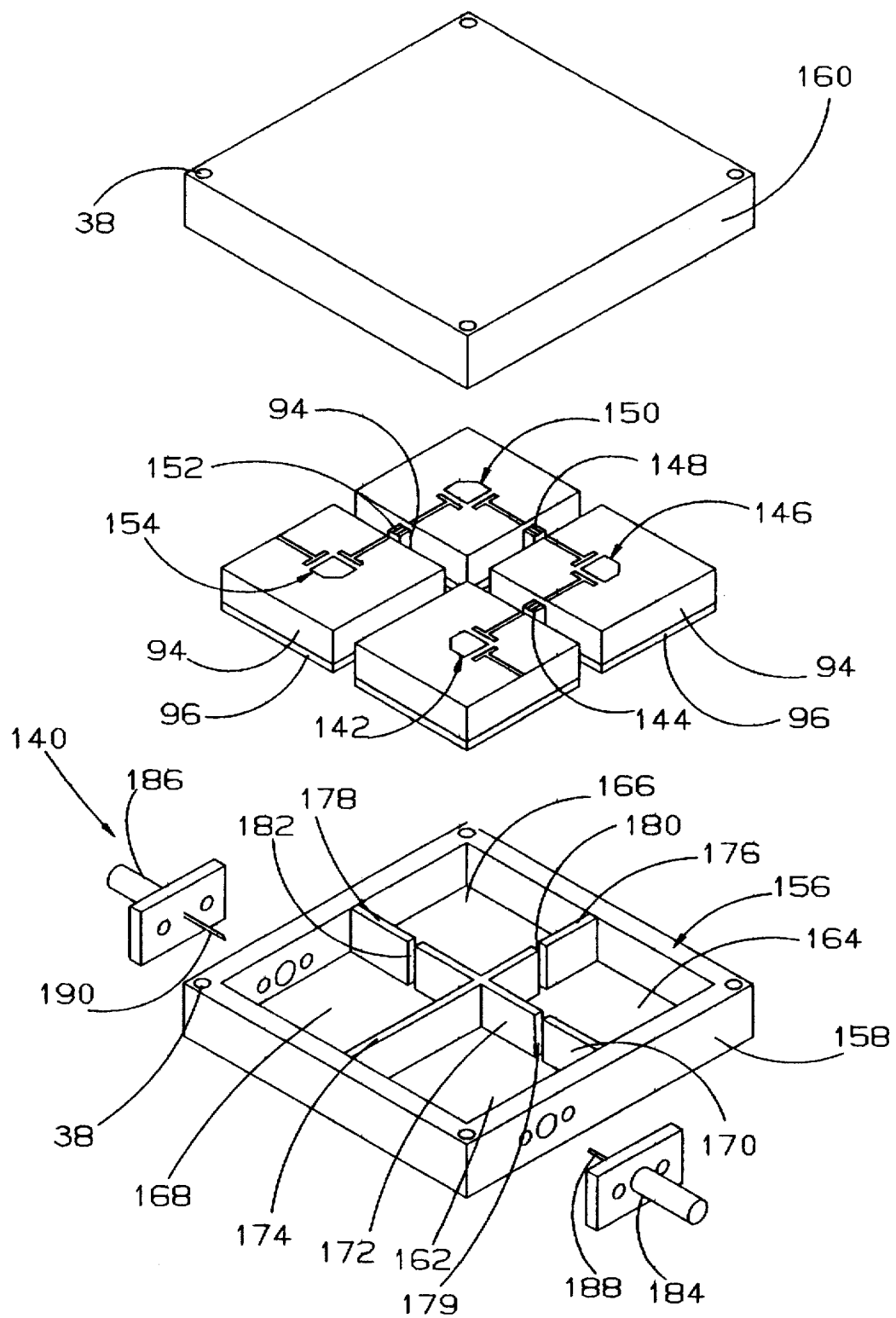
FIG. 11 is an exploded perspective view of a further embodiment of an eight-pole dual-mode filter where each resonator is located in a different circuit and in a different compartment of a housing.

In FIG. 11, there is shown an exploded perspective view of an eight-pole filter 140 having partial circuits 142, 144, 146, 148, 150, 152, 154 that together constitute one circuit. The four partial circuits 142, 146, 150, 154 are generally identical to one another and the partial circuits 144, 148, 152 are generally identical to one another. Each partial circuit has a substrate 94 and a metallization layer 96. The filter 140 has a compartmentalized housing 156 with a base 158 and a cover 160. The base of the housing has four compartments 162, 164, 166, 168. The four compartments are created by septa 170, 172, 174, 176, 178. The septa 170, 172 are separated by an aperture 179 between the compartments 162, 164. The septa 174, 176 are separated by an aperture 180 between the compartments 164, 166. The septa 172, 174 are separated by an aperture 182 between the compartments 166, 168. The filter 140 has an input 184 and an output 186 having connectors 188, 190. The input 184 and output 186 are connected through the housing in a similar manner as the input 86 and output 88 of the filter 65 shown in FIGS. 9 and 10. The opening 38 are identical to the opening 38 of FIG. 1.

Figure 12:
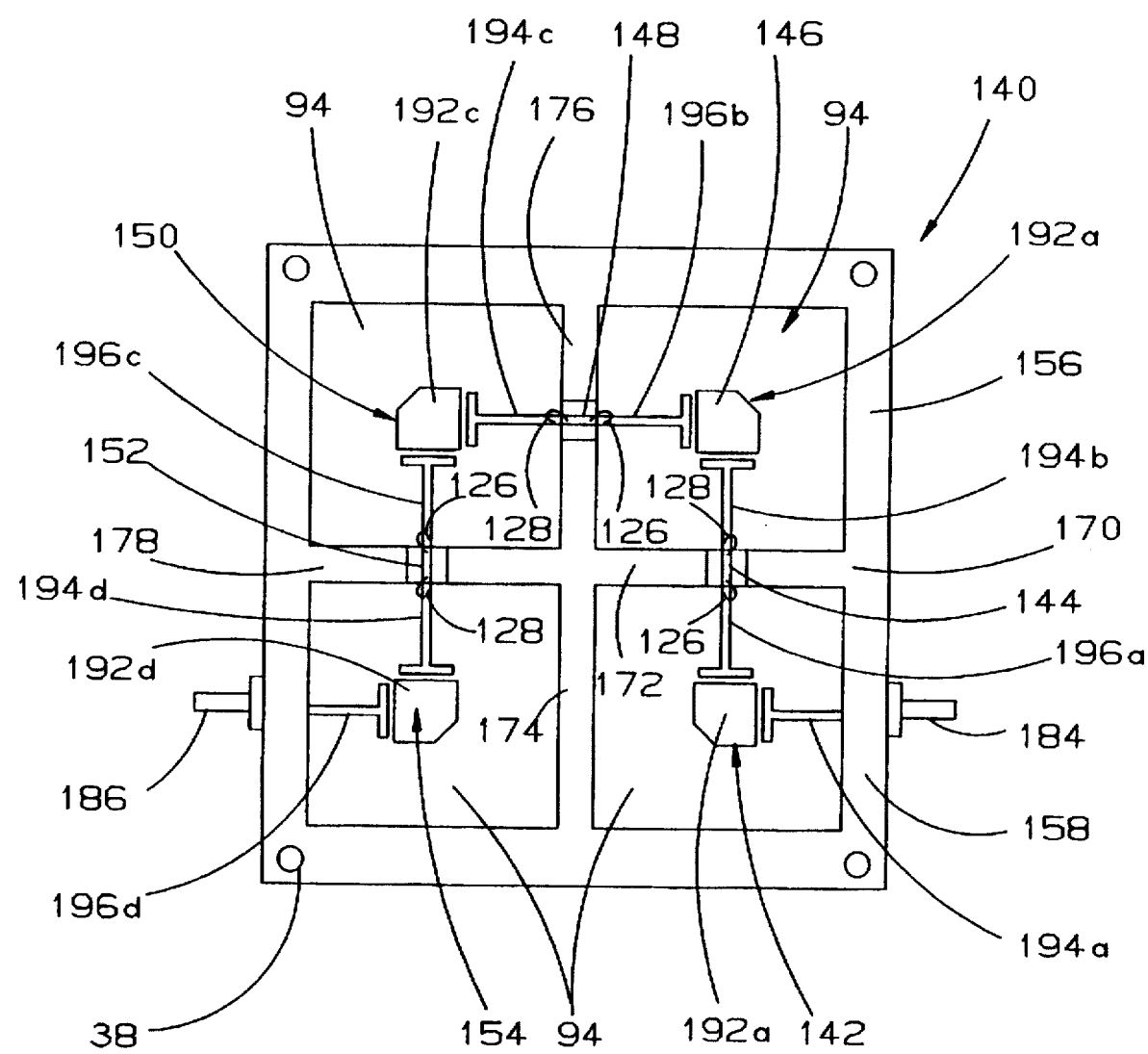
FIG. 12 is a top view of an assembled filter in accordance with FIG. 11 with a cover removed.

In FIG. 12, the filter 140 is shown assembled within the base 158 of the housing 156 with the cover (not shown) removed. Each of the partial circuits 142, 146, 150, 154 has a patch resonator 192a, 192b, 192c, 192d, one T-shaped input line 194a, 194b, 194c, 194d and one T-shaped output line 196a, 196b, 196c, 196d respectively. Energy is coupled through the three partial circuits 144, 148, 152 by interconnects 126, 128. The base 158 and cover 160 (not shown herein) contain suitable openings 38 to receive screws or bolts (not shown) so that the cover 160 (not shown herein) can be securely attached to the base 158. The same reference numerals have been used to describe those components of FIG. 12 that are identical to those components of FIG. 11.

Figure 13:
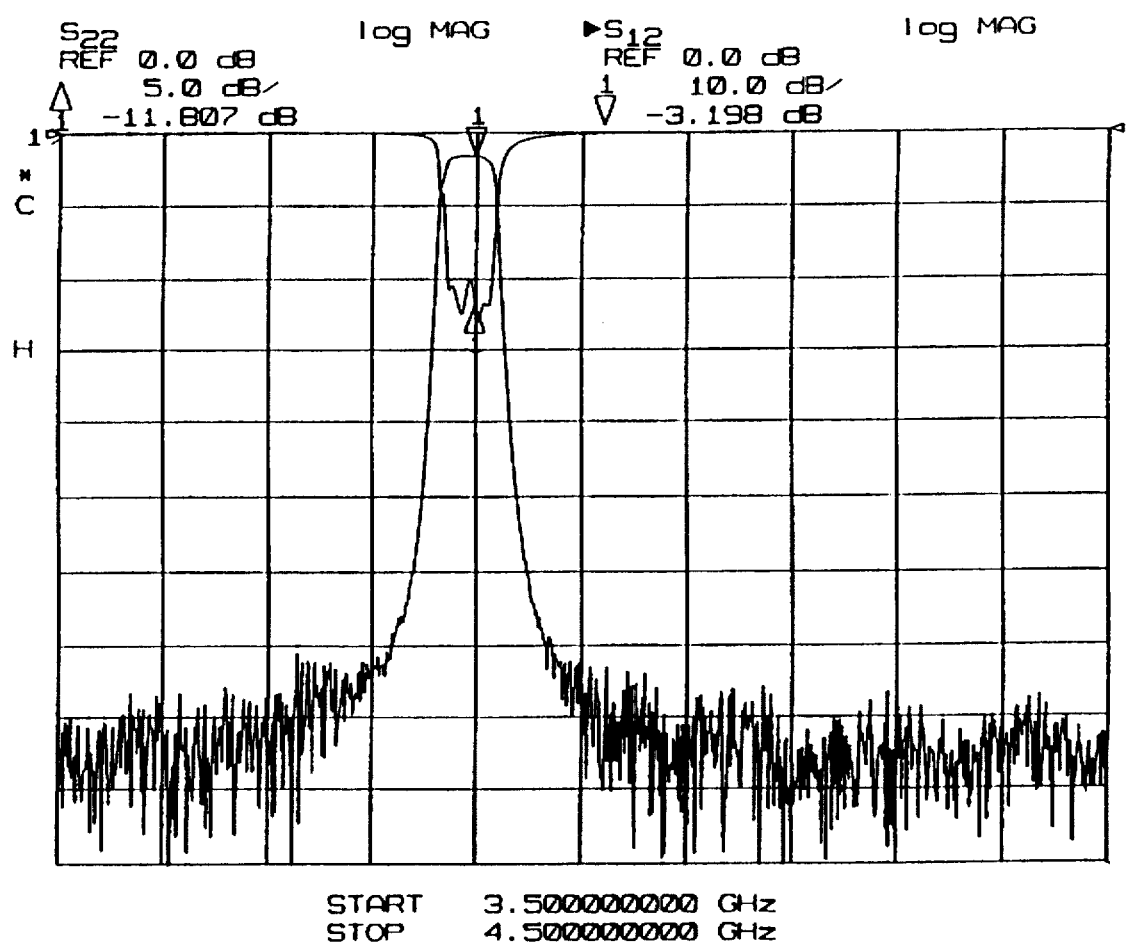
FIG. 13 is a graph showing the insertion loss and return loss for an eight-pole filter having a design similar to that shown in FIGS. 11 and 12.

FIG. 13 shows the return loss and insertion loss for an eight-pole filter that is designed similarly to the filter shown in FIGS. 11 and 12, except for the results shown in FIG. 13, the coupling paths 112, 136 have been removed from each of the circuits 66, 70 to produce a Chebyshev response. Also, for the results shown in FIG. 13, the circuit was made of a singlesided high temperature superconductive wafer that becomes a superconductor at cryogenic temperatures. The coupling between the adjacent resonators was eliminated by septae. Since the band is so narrow, all eight peaks for the eight-pole filter cannot be seen in the return loss curve. No tuning elements were used to achieve the performance shown in FIG. 13.

While each resonator 192 of the filter 140 can be made to resonate in a dual-mode so that the filter functions as an eight-pole filter, the resonators can also be made to resonate in a single mode so that the filter functions as a four-pole filter.

In operation of the filter 140 shown in FIG. 12, energy is coupled through the input 184 into the partial circuit 142 through the input line 194a to the resonator 192a and out of the resonator 192a, through the output line 196a, through the partial circuit 144 and into the input line 194b of the partial circuit 146. Energy is coupled into the resonator 192b and out of the resonator 192b, through the output line 196b and through the partial circuit 148, to the input line 194c of the partial circuit 150. Energy is coupled from the input line 194c into the resonator 192c and out of the resonator 192c to the output line 196c. From the output line 196c, energy is coupled through the partial circuit 152 into the input line 194d of the partial circuit 154 to the resonator 192d and to the output line 196d of the partial circuit 154. Energy is coupled from the output line 196d of the partial circuit 154 to the output 186. It can be seen that the output 196a, partial circuit 144 and input 194b form an I-shaped coupling path between the resonators 192a and 192b. Similarly, the output 196b, partial circuit 148 and input 194c form an I-shaped coupling path between the resonators 192b and 192c and the output 196c, partial circuit 152 and input 192d form an I-shaped coupling path between the resonators 192c and 192d.

In dual-mode operation of the filter 140 shown in FIG. 12, energy is coupled from the first mode to the second mode in the resonator 192a of the partial circuit 142. Energy is coupled from the second mode of the resonator 192a of the partial circuit 142 to the third mode of the resonator 192b of the partial circuit 146. Energy is coupled from the third mode to the fourth mode in the resonator 192b of the partial circuit 146. Energy is coupled from the fourth mode of the partial circuit 146 to the fifth mode of the resonator 192c of the partial circuit 150. Energy is coupled from the fifth mode to the sixth mode in the resonator 192c of the partial circuit 150 and from the sixth mode to the seventh mode in the resonator 192d of the partial circuit 154. Energy is coupled from the seventh mode to the eighth mode of the resonator 192d in the partial circuit 154 and from the eighth mode to the output 186. The filter 140 can be operated as an eight-pole filter with quasi-elliptic or self-equalized functions.

Figure 14:
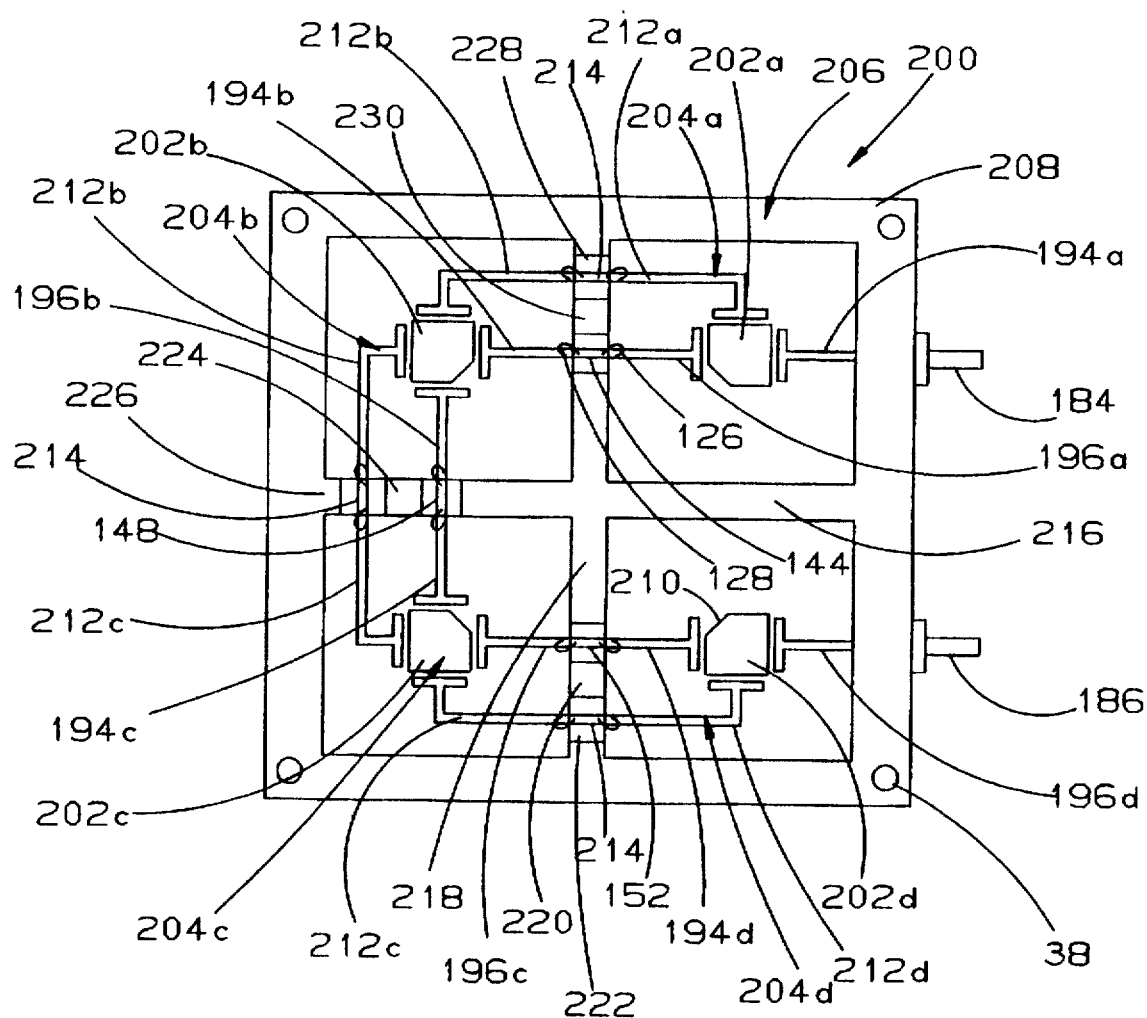
FIG. 14 is a top view of a variation of the assembled filter of FIG. 13 with the cover removed.

In FIG. 14, there is shown a top view of a filter 200 having four patch resonators 202a, 202b, 202c and 202d, each resonator being part of a partial circuit 204a, 204b, 204c, 204d where each partial circuit is mounted in a different compartment of a housing 206. Only the base 208 of the housing 206 is shown in FIG. 14 as the cover (not shown) is removed. The filter 200 has a physical structure that is almost identical to the filter 140 shown in FIGS. 12 and 13. The same reference numerals have been used in FIG. 14 for those components that are virtually the same as those shown in FIGS. 12 and 13. The patch resonators 202a, 202b, 202c, 202d each have perturbation means 210 at an inner corner thereof. In addition, the partial circuits 204a, 204d are generally mirror images of one another and have a partial T-shaped coupling path 212a, 212d that extends to resonators 202b, 202c respectively. Partial circuits 204b, 204c are generally mirror images of one another and each of these circuits has two T-shaped coupling paths 212b, 212b', 212c, 212c' respectively that extend toward resonators in adjacent cavities. Three additional partial circuits 214 are mounted in apertures (not shown). The partial circuits 204a, 204b, 204c, 204d, 144, 148, 152, 214 constitute the circuit for the filter 200. The filter has an input 184 and an output 186. The housing 206 is divided into four compartments by septa 216, 218, 220, 222, 224, 226, 228, 230.

In dual-mode operation of the filter 200, RF energy is coupled into the resonator 202a through the input 184 and the input line 194a. Coupling between a second mode of the resonator 202a and a third mode of the resonator 202b is provided by output line 196a, partial circuit 144 and input line 194b, which together form an I-shaped coupling path. The partial circuit 144 is connected to the output line 196a by interconnect 126 and to the input line 194b by the interconnect 128. The interconnects 126, 128 are in all of the coupling paths of the filter 200 when the coupling path extends from one compartment of the housing to another. The interconnects will not be specifically discussed for the remaining coupling paths. Coupling between a first mode of the resonator 202a and a fourth mode of the resonator 202b is provided through output line 204a, partial circuit 214 and input line 212b, which together form a U-shaped coupling path. Coupling between the fourth mode of the resonator 202b and a fifth mode of the resonator 202c is provided through output line 196b, circuit 148 and input line 194c, which together form an I-shaped coupling path. Coupling between the third mode of the resonator 202b and a sixth mode of the resonator 202c is provided through output line 212b', circuit 214 and input line 212c, which together form a U-shaped coupling path. Coupling between the sixth mode of the resonator 202c and a seventh mode of the resonator 202d is provided through output line 196c, circuit 152 and input line 194d, which together form an I-shaped coupling path between the resonators 202c and 202d. Coupling between the fifth mode of the resonator 202c and an eighth mode of the resonator 202d is provided through output line 212c', circuit 214 and input line 212d, which together form a U-shaped coupling path between the resonators 202c and 202d. Energy is coupled out of the filter 200 through the output line 196d and the output 186. The input 184 and the output 186 are probes.

Figure 15:
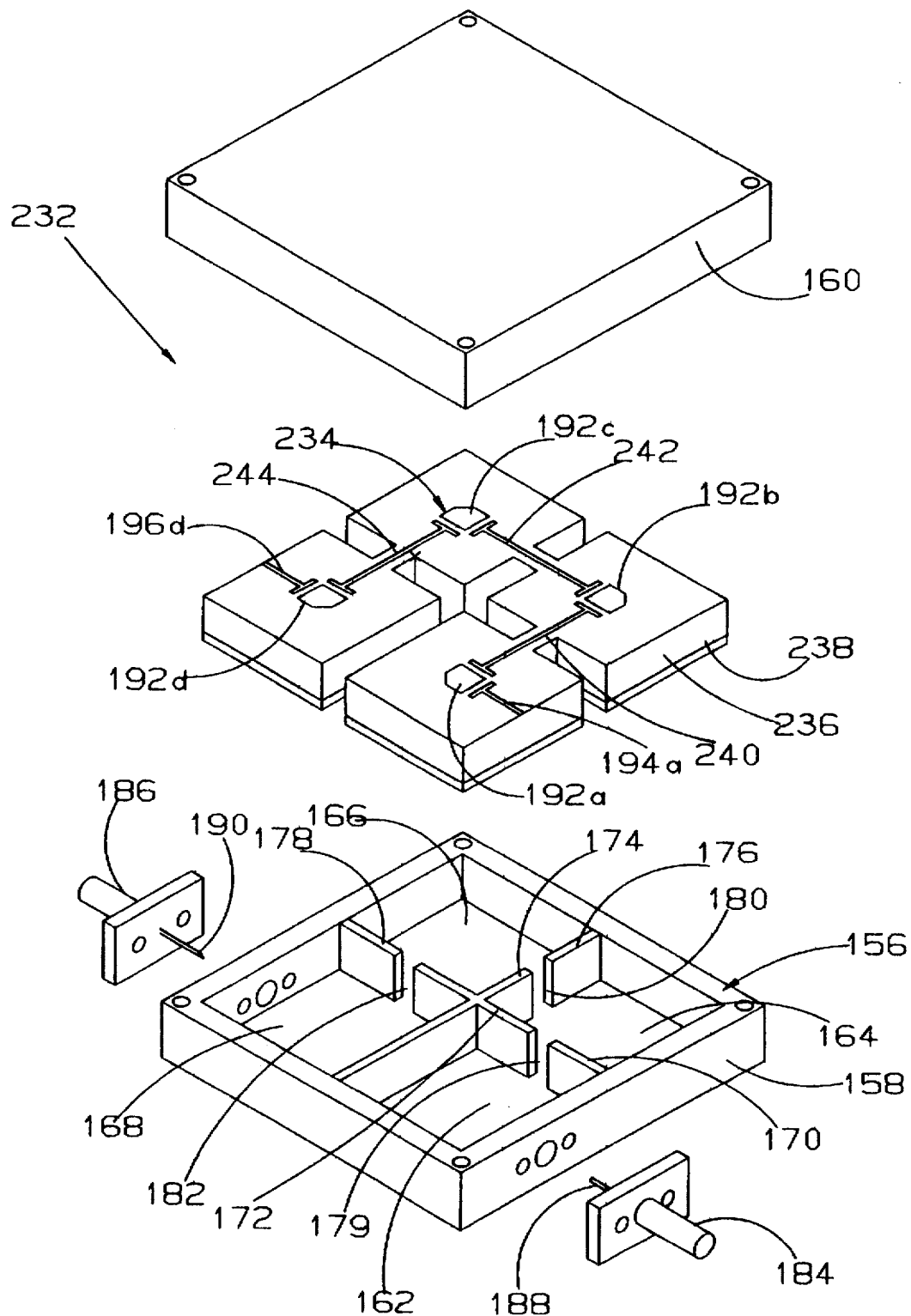
FIG. 15 is an exploded perspective view of a filter having four resonators with each resonator being in a separate compartment of a housing and the circuit being in one piece.

In FIG. 15, there is shown a filter 232 which is a variation of the filter 140 shown in FIGS. 12 and 13. Those components of the filter 232 that are essentially the same as the components of the filter 140 are identified with the same reference numerals. The housing 156 and the input 184 and output 186 are identical to those of the filter 140. The filter 232 has a circuit 234 that is formed on a single substrate 236 having a single metallization layer 238. The circuit 234, substrate 236 and metallization layer 238 are cut in a single piece that is shaped to fit within the base 158 of the housing 156 so that there is one resonator 192a, 192b, 192c, 192d in each compartment 162, 164, 166, 168 respectively. The circuit 234 has the input line 194a and the output line 196d. There is an I-shaped coupling path 240 between the resonators 192a and 192b. There is an I-shaped coupling path 242 between the resonators 192b and 192c and an I-shaped coupling path 244 between the resonators 192c and 192d. Since the circuit 234, substrate 236 and metallization layer 238 are cut in one piece, the interconnects 126, 128 shown in FIG. 13 for the filter 140 are not required. The circuit 234, substrate 236 and metallization layer 238 are cut in one piece so that they fit properly between the septa in the base 158 of the housing 156 with the I-shaped coupling paths 240, 242, 244 extending through the apertures 179, 180, 182. The filter 234 operates in the same manner as the filter 140 but has a better insertion loss performance and is easier to assemble. While the circuit of the filter 140 has seven separate pieces (of partial circuit) that must be assembled into the housing, the circuit 234 of the filter 232 has only one piece. As a further variation, a filter could be constructed where the circuit, substrate and metallization layer are cut into more than one piece but less than seven pieces. Still further, a circuit could be formed on a substrate and metallization layer that has a pre-existing shape to conform to the arrangement of septa and apertures within a housing so that it is not necessary to cut the substrate and metallization layer at all.

While the present invention has been fully described and a preferred embodiment has been set out, there are numerous variations and modifications that can be made to the invention within the scope of the attached claims by those skilled in the art. For example, the input line and output line and/or the coupling path or end portions could be L-shaped rather than T-shaped. As another example, the I-shaped coupling paths could be used to act as resonant elements. The dimensions of the I-shaped coupling path in FIG. 2 could be chosen to realize a five-pole Chebyshev filter rather than a four-pole Chebyshev filter. In this arrangement, the two T-shaped input and output lines 24, 26 will provide the necessary coupling between the two patch resonators 12, 14 and the resonant line of I-shaped coupling path 16, 20.

As yet another example of variations that can be utilized, when the circuits are used in a compartmentalized housing, two or more of the partial circuits or even all of the partial circuits for any filter could be formed in one piece for insertion into the base of the housing. For example, for the filter 65 of FIG. 9, the partial circuits 66, 68, 70 as well as the substrate 94 and metallization layer 96 for each of these partial circuits could be formed in one piece. The substrate and metallization layer could then be cut-away between the partial circuits 66, 70 up to the partial circuit 68 so that the substrate and metallization layer for the two partial circuits 66, 70 would remain joined by the circuit 68 into one piece. That one piece would then be inserted into the housing. In this arrangement, the interconnects 126, 128 could be eliminated as the circuit 68 would not be a separate piece but would be connected directly to the circuit 66, 70. The same one piece circuit arrangement could be utilized for the filter 200 of FIG. 14 or for other filters that are within the scope of the attached claims. For the filter 140, the partial circuits 142, 146, 150, 154 would be interconnected by one substrate 94 and one metallization layer 96 that was cut in such a way that the filter would fit into the base 158 of the housing 156. In place of a compartmentalized housing for a filter, separate housings can be utilized.

What I claim as my invention is:

1. A bandpass filter comprising:
   (a) a plurality of patch resonators in a planar configuration, each resonator having a respective periphery with a corresponding perturbation means thereon;
   (b) a first coupling path extending between two of said resonators, at least two of said resonators being at least dual mode resonators, said first coupling path having two ends, said first coupling path having a respective longitudinal axis in each area of said ends that extends through said ends and is substantially perpendicular to an adjacent section of said periphery of the corresponding resonator, said ends each having a respective end portion thereon, each respective end portion being substantially perpendicular to said corresponding longitudinal axis, each respective end portion being substantially parallel to and spaced apart from an adjacent section of said periphery of the corresponding resonator, said filter having a housing and an input and an output.

2. A filter as claimed in claim 1 wherein said end portions are respectively symmetrical about said corresponding longitudinal axis.

3. A filter as claimed in claim 2 wherein each end portion respectively comprises a T-shape with said corresponding area of said ends, said first coupling path being shaped to interconnect said ends.

4. A filter as claimed in claim 2 wherein there is a second coupling path extending between two of said plurality of resonators and each of said plurality of resonators having a rectangular shape, said second coupling path being separated from said first coupling path, said first coupling path having an I-shape and said second coupling path having a U-shape with two ends, said second coupling path having a respective longitudinal axis in each area of said ends that extends through said ends and is substantially perpendicular to an adjacent section of said periphery of a corresponding resonator, said ends each having a respective end portion thereon, each respective end portion being substantially perpendicular to said corresponding longitudinal axis, each respective end portion being substantially parallel to and spaced apart from an adjacent section of said periphery of said corresponding resonator.

5. A filter as claimed in any one of claims 3 or 4 wherein the filter is a microstrip filter and the plurality of resonators, coupling path, input line and output line are a printed circuit on a substrate and there are at least three resonators of said plurality of resonators with said first coupling path being located between a first resonator and a second resonator of said plurality of resonators and a third coupling path being located between a second resonator and a third resonator of said plurality of resonators, said third coupling path having a shape that is similar to a shape of said first coupling path.

6. A filter as claimed in claim 2 wherein the first coupling path is U-shaped and coupling between two of said plurality of resonators occurs along said first coupling path and across a respective gap, said respective gap being a perpendicular distance between two of said plurality of resonators.

7. A filter as claimed in claim 3 wherein the filter is a microstrip filter and the plurality of resonators, coupling path, input and output line constitute a circuit, said circuit being a printed circuit on a substrate, said filter having at least two resonators of said plurality of resonators, said substrate having a bottom surface covered by a metallization layer.

8. A filter as claimed in claim 7 wherein a material of the circuit is selected from the group consisting of metals, superconductors and ceramic materials that become superconductors at cryogenic temperatures.

9. A filter as claimed in claim 8 wherein a material of the metallization layer is selected from the group consisting of metals, superconductors and ceramic materials which become superconductors at cryogenic temperatures.

10. A filter as claimed in any one of claim 8 or 9 wherein the circuit and the metallization layer are respectively selected from the group consisting of gold, silver, calcium, copper, yittrium barium copper oxide and thallium barium copper oxide.

11. A filter as claimed in any one of claims 1, 4 or 9 wherein the filter has four resonators of said plurality of resonators.

12. A filter as claimed in claim 7 wherein the filter has a first pair of resonators and a second pair of resonators of said plurality of resonators and there are separation means located between each pair of resonators of said plurality of resonators to prevent undesirable coupling occurring between a resonator from the first pair and a resonator of the second pair of said plurality of resonators.

13. A filter as claimed in claim 12 wherein the circuit, substrate and metallization layer contain cuts to separate the first pair of resonators from the second pair of resonators of said plurality of resonators, said separation means being septa, said septa being located within the housing to divide the housing into two separate compartments, said septa containing an aperture to accommodate a coupling path between one resonator from the first pair and another resonator from the second pair of said plurality of resonators, all of the plurality of resonators being located within a housing, two resonators of said plurality of resonators being located in each compartment.

14. A filter as claimed in any one of claims 5, 12 or 13 wherein the circuit, substrate and metallization layer contain cuts so that the circuit remains whole with cuts being located to accommodate said separation means.

15. A filter as claimed in any one of claims 12 or 13, wherein the circuit, substrate and metallization layer contain cuts so that said circuit is divided into two parts within the housing, said parts being connected to one another.

16. A filter as claimed in claim 7 wherein there are four resonators of said plurality of resonators and the housing has four compartments, one compartment for each resonator.

17. A filter as claimed in any one of claims 7, 12 or 16 wherein the filter is configured to realize a Chebyshev filter response.

18. A filter as claimed in claim 16 wherein the compartments are arranged within the housing by septa, said septa containing apertures to accommodate the coupling paths between three of four resonators of said plurality of resonators.

19. A filter as claimed in claim 18 wherein there is a first I-shaped coupling path and a second U-shaped coupling path between a first resonator and a second resonator of said plurality of resonators, a third I-shaped coupling path and a fourth U-shaped coupling path between a second resonator and a third resonator of said plurality of resonators and a fifth I-shaped coupling path and a sixth U-shaped coupling path between a third resonator and a fourth resonator of said plurality of resonators.

20. A filter as claimed in any one of claims 1, 2 or 3 wherein said first coupling path has an I-shape.

21. A filter as claimed in any one of claims 1, 2 or 3 wherein an input line extends between said input and a first resonator of said plurality of resonators and an output line extends between a last resonator of said plurality of resonators and said output, said input line and said output line each including a respective substantially perpendicular end portion that is substantially parallel to and spaced apart from an edge of said corresponding resonator located adjacent thereto.

22. A bandpass filter comprising a plurality of patch resonators arranged in a planar configuration, each resonator having a respective periphery with corresponding perturbation means located thereon, each resonator being mounted in a housing, with separation means being located between a first resonator and a second resonator of said plurality of resonators to prevent undesirable coupling between said first and second resonators of said plurality of resonators, said separation means being a barrier, at least two of said resonators being at least dual mode resonators, said resonators being part of a circuit extending between an input and an output of said filter.

23. A filter as claimed in claim 22 wherein the filter is a microstrip filter and the circuit is a printed circuit on a substrate with a metallization layer being affixed to a bottom surface of said substrate.

24. A filter as claimed in claim 22 wherein there is one housing and the separation means are septa, said septa having an aperture to accomodate a coupling path extending between a plurality of resonators on both sides of the septa.

25. A filter as claimed in claim 24 wherein there is a first coupling path extending between two of said plurality of resonators, said first coupling path having two ends, said respective first coupling path having a respective longitudinal axis in each area of said ends that extends through said ends and is substantially perpendicular to an adjacent section of said periphery of the corresponding resonator, said ends each having an end portion thereon, each respective end portion being substantially perpendicular to said corresponding longitudinal axis, each respective end portion being substantially parallel to and spaced apart from an adjacent section of said periphery of the corresponding resonator located immediately adjacent to said respective end portion.

26. A filter as claimed in claim 25 wherein said end portions are respectively symmetrical about said corresponding longitudinal axis.

27. A filter as claimed in claim 26 wherein said end portions respectively comprises a T-shape with said corresponding area of said ends.

28. A filter as claimed in claim 27 wherein there is a second coupling path extending between two of said resonators of said plurality of resonators and said resonators have a rectangular shape, said second coupling path being separated from said first coupling path, said first coupling path having a U-shape with two ends, each with a substantially perpendicular end portion, said end portions of said second coupling path being substantially parallel to and spaced apart from an adjacent section of said periphery of said resonator.

29. A filter as claimed in claim 28 wherein the first coupling path is U-shaped and coupling between two of said plurality of resonators occurs along said first coupling path and across a respective gap, said respective gap being a perpendicular distance between two of said plurality of resonators that are located within the same compartment.

30. A filter as claimed in any one of claims 22, 23 or 24 wherein the material of the circuit is selected from the group consisting of metals and ceramic materials that become superconductors at cryogenic temperatures.

31. A filter as claimed in any one of claims 22, 23 or 24 wherein the material of the metallization layer is selected from the group consisting of metals and ceramic materials which become superconductors at cryogenic temperatures.

32. A filter as claimed in any one of claims 22, 23 or 24 wherein a material of the circuit and a material of the metallization layer is respectively selected from one of the group consisting of gold, copper, yittrium barium copper oxide and thalium barium copper oxide.

33. A filter as claimed in claim 32 wherein the filter has four resonators of said plurality of resonators and the housing has two compartments with two resonators of said plurality of resonators being located in each compartment.

34. A filter as claimed in any one of claims 22, 23 or 24 wherein the plurality of resonators resonate in a mode that is selected from the group consisting of a single mode and a dual mode.

35. A filter as claimed in any one of claims 22, 23 or 24 wherein the filter has four resonators of said plurality of resonators and the housing has four compartments with one resonator in each compartment.

36. A filter as claimed in any one of claims 22, 23 or 24 wherein the filter has four resonators of said plurality of resonators and the housing has septa that divide the housing into four compartments, there being one resonator in each compartment, said septa containing apertures to accomodate coupling paths between three of said four resonators.

37. A filter as claimed in any one of claims 22, 23 or 24 wherein the filter has four resonators of said plurality of resonators and the housing has septa that divide the housing into four compartments, there being one resonator in each compartment, said septa containing apertures to accomodate coupling paths between three of said four resonators of said plurality of resonators, said filter containing two coupling paths, one coupling path being I-shaped and the other coupling path being U-shaped, said two coupling paths being located between three of said four resonators of said plurality of resonators.

38. A filter as claimed in any one of claims 22, 23 or 24 wherein there is a first coupling path extending between two of said plurality of resonators.

39. A filter as claimed in any one of claims 22, 23 or 24 wherein an input line extends between said input and a first resonator of said plurality of resonators and an output line extends between a last resonator of said plurality of resonators and said output, said input line and said output line each including a respective substantially perpendicular end portion that is substantially parallel to and spaced apart from an edge of said corresponding resonator located adjacent thereto.

40. A band pass filter comprising:
(a) a plurality of patch resonators in a planar configuration, each resonator having a respective periphery with a corresponding perturbation means thereon;
(b) a first coupling path extending between two of said resonators, said first coupling path having two ends, said first coupling path having a respective longitudinal axis in each area of said ends that extends through said ends and is substantially perpendicular to an adjacent section of said periphery of the corresponding resonator, said ends each having a respective end portion thereon, each respective end portion comprising a T-shape that is respectively symmetrical about said corresponding longitudinal axis, each respective end portion being substantially parallel to and spaced apart from an adjacent section of said periphery of the corresponding resonator, said filter having a housing and an input and an output.

41. A filter as claimed in claim 40 wherein the filter is a microstrip filter and the plurality of resonators, coupling path, input line and output line are printed on a substrate and there are at least three resonators of said plurality of resonators with a first coupling path being located between a first resonator and a second resonator of said plurality of resonators and a third coupling path being located between a second resonator and a third resonator of said plurality of resonators.

42. A filter as claimed in any one of claims 40 or 41 wherein the filter has four resonators of said plurality of resonators that are each made to resonate in a mode selected from the group of a single mode and a dual mode.

43. A filter as claimed in claim 42 wherein the circuit, substrate and metallization layer contain cuts to separate a first pair of resonators from a second pair of resonators of said plurality of resonators, said separation means being septa, said septa being located within the housing to divide the housing into two separate compartments, said septa containing an aperture to accommodate a coupling path between one resonator from the first pair and another resonator from the second pair, all of the plurality of resonators being located within a housing, two resonators of said plurality of resonators being located in each compartment to prevent undesirable coupling occurring between a resonator from the first pair and a resonator from the second pair of said plurality of resonators.

44. A filter as claimed in claim 43 wherein the filter is configured to realize a Chebyshev filter response.

45. A filter as claimed in claim 43 wherein the circuit, substrate and metallization contain cuts so that said circuit is divided into two parts within the housing, said parts being connected to one another.

46. A filter as claimed in claim 45 wherein the circuit, substrate and metallization layer contain cuts so that the circuit remains-whole with cuts being made to accommodate said separation means.

47. A filter as claimed in claim 46 wherein there are four resonators of said plurality of resonators and the housing has four compartments, one compartment for each resonator.

48. A filter as claimed in claim 47 wherein the compartments are provided within the housing by septa, said septa containing apertures to accommodate coupling paths between three of the four resonators of said plurality of resonators.

49. A filter as claimed in claim 48 wherein there is a first I-shaped coupling path and a second U-shaped coupling path between three of the four resonators of said plurality of resonators.

50. A bandpass filter comprising a plurality of patch resonators arranged in a planar configuration, each resonator having a periphery with a perturbation means located thereon, each resonator being mounted in a housing, with separation means being located between a first resonator and a second resonator of said plurality of resonators to prevent undesirable coupling between said first and second resonators, said resonators being part of a circuit extending between an input and an output of said filter, said filter being a microstrip filter and said circuit being printed on a substrate with a metallization layer being affixed to a bottom surface of said substrate, there being one housing and said separation means being a septa, said septa having an aperture to accommodate a coupling path extending between a plurality of resonators on either side of the septa.

51. A filter as claimed in claim 50 wherein there is a first coupling path extending between two of said resonators, said coupling path having two ends, each with a substantially perpendicular end portion that is substantially parallel to and spaced apart from an edge of said resonator adjacent thereto, said filter having an input line extending between said input and said first resonator and an output line extending between a last resonator and said output.

52. A filter as claimed in claim 51 wherein there is a second coupling path extending between two of said resonators of said plurality of resonators and said resonators have a rectangular shape, said second coupling path being separated from said first coupling path, said first coupling path having an I-shape and said second coupling path having a U-shape with two ends, each with a substantially perpendicular end portion, said end portions of said second coupling path being substantially parallel to and spaced apart from an adjacent section of said periphery of said resonator.

53. A filter as claimed in claim 52 wherein coupling between two of said plurality of resonators occurs along said first coupling path and across a gap, said gap being a perpendicular distance between two of said plurality of resonators that are located within the same compartment.

54. A filter as claimed in claim 53 wherein an input line extends between said input and a first resonator of said plurality of resonators and an output line extends between a last resonator of said plurality of resonators and said output, said input line and said output line each including a respective substantially perpendicular end Portion that is substantially parallel to and spaced apart from an edge of said corresponding resonator located adjacent thereto.

55. A filter as claimed in claim 50 wherein an input line extends between said input and a first resonator of said plurality of resonators and an output line extends between a last resonator of said plurality of resonators and said output, said input line and said output line each including a respective substantially perpendicular end portion that is substantially parallel to and spaced apart from an edge of said corresponding resonator located adjacent thereto.

56. A filter as claimed in claim 55 wherein said first coupling path has an I-shape.

* * * * *